United States Patent
Chen (10) Patent No.: US 9,160,160 B2
(45) Date of Patent: Oct. 13, 2015

(54) POWER SUPPLY WITH OUTPUT PROTECTION AND CONTROL METHOD OF THE POWER SUPPLY

(71) Applicant: ACBEL POLYTECH INC., New Taipei (TW)

(72) Inventor: Wei-Dar Chen, New Taipei (TW)

(73) Assignee: ACBEL POLYTECH INC., New Taipei (TW)

( * ) Notice: Subject to any disclaimer, the term of this patent is extended or adjusted under 35 U.S.C. 154(b) by 362 days.

(21) Appl. No.: 13/760,851

(22) Filed: Feb. 6, 2013

(65) Prior Publication Data

US 2014/0112036 A1 Apr. 24, 2014

(30) Foreign Application Priority Data

Oct. 23, 2012 (TW) ............................. 101139031 A (51) Int. Cl.
*H02H 3/08* (2006.01)
(52) U.S. Cl.
CPC ...................................... *H02H 3/085* (2013.01)
(58) Field of Classification Search
CPC .................................................... H02H 3/085
See application file for complete search history.

(56) References Cited

U.S. PATENT DOCUMENTS

| 7,911,812 | B2* | 3/2011 | Colbeck et al. | 363/21.02 |
| 8,102,164 | B2* | 1/2012 | Colbeck et al. | 323/282 |
| 2008/0198638 | A1* | 8/2008 | Reinberger et al. | 363/74 |
| 2009/0091957 | A1* | 4/2009 | Orr et al. | 363/79 |
| 2012/0262961 | A1* | 10/2012 | Chien et al. | 363/84 |

* cited by examiner

*Primary Examiner* — Emily P Pham
(74) *Attorney, Agent, or Firm* — Birch, Stewart, Kolasch & Birch, LLP (57) ABSTRACT

The present invention relates to a power supply with output protection and a control method of the power supply. The invention mainly provides a pre-protection value lower than a default over-current protection value. When a present output current of the power supply is higher than or equal to the pre-protection value and is lower than the over-current protection value, the method firstly determines whether the power supply has abnormal conditions. When the power supply has abnormal conditions, the method can automatically provide or stop providing a working voltage to a load. When the present output current is further higher than or equal to the over-current protection value, the method takes an over-current protection action. By multi-level monitoring of the current values, the invention properly provides an over-current protection.

14 Claims, 7 Drawing Sheets

POWER SUPPLY WITH OUTPUT PROTECTION AND CONTROL METHOD OF THE POWER SUPPLY

CROSS-REFERENCE TO RELATED APPLICATIONS

This application claims the benefit of Taiwan patent application No. 101139031, filed on Oct. 23, 2012, the disclosure of which is incorporated herein in its entirety by reference.

BACKGROUND OF THE INVENTION

1. Field of the Invention

The present invention relates to a power supply, and more particularly to a power supply with output protection and a control method of the power supply.

2. Description of Related Art

Figure 4:
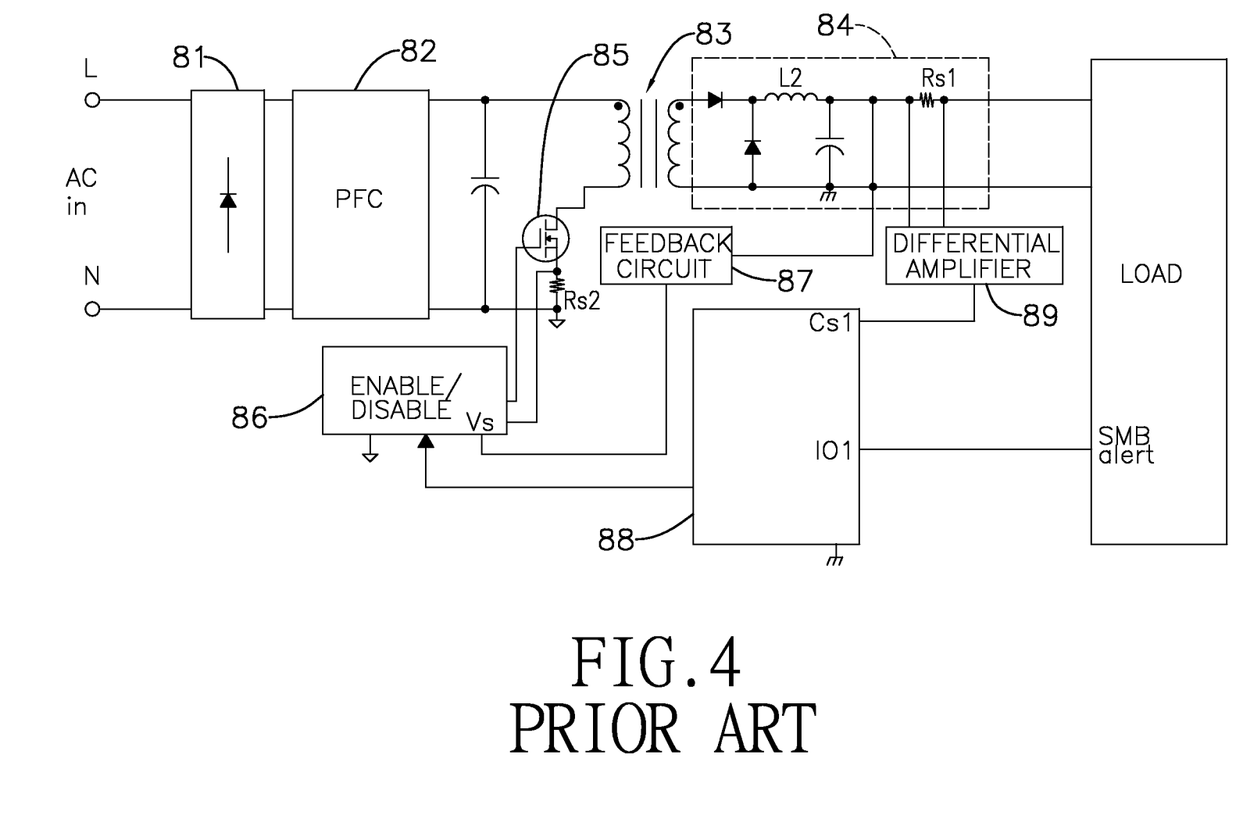
FIG. 4 is a circuit block diagram of a conventional power supply.

With reference to FIG. 4, a circuit diagram of a conventional power supply is disclosed. The conventional power supply has a rectifier circuit 81, a PFC (Power Factor Correction) circuit 82, a transformer 83, an output circuit 84, a power switch device 85, a PWM (Pulse Width Modulation) controller 86, a feedback circuit 87 and a microcontroller 88.

An input terminal of the output circuit 84 is connected to a secondary side of the transformer 83. An output terminal of the output circuit 84 is connected to a load, i.e. a server system. The power switch device 85 is connected to a primary side of the transformer 83 and is controlled by the PWM controller 86 to activate the output circuit 84 for providing the load with a working voltage or stopping outputting the working voltage. The PWM controller 86 is connected to the output terminal of the output circuit 84 via the feedback circuit 87 to acquire an output voltage from the output circuit 84.

The microcontroller 88 has an output current detection terminal (Cs1), an alarm signal output terminal (IO1) and an output terminal. The output current detection terminal (Cs1) is connected to the output terminal of the output circuit 84 through a differential amplifier 89 to acquire an output current from the output circuit 84. The output circuit 84 has an output resistor (Rs1). Two terminals of the output resistor (Rs1) are connected to two input terminals of the differential amplifier 89. An output terminal of the differential amplifier 89 is connected to the output current detection terminal (Cs1) of the microcontroller 88. The microcontroller 88 can acquire the output current via the differential amplifier 89. The alarm signal output terminal (IO1) and the output terminal of the microcontroller 88 are respectively connected to the load and the PWM controller 86.

The conventional power supply has an output protection function, usually an over-current protection function. The microcontroller 88 acquires a present output current from the output terminal of the output circuit 84 through the differential amplifier 89. When the present output current is higher than a default ratio of a rated current, for example 125%, the present output current reaches an over-current protection point. The microcontroller 88 then turns off the PWM controller 86, such that the output circuit 84 stops providing the working voltage to the load. Meanwhile, the microcontroller 88 informs the load through the alarm signal output terminal (IO1). Only when a current received by the load from the power supply is lower than the over-current protection point, the power supply is rebooted to restore the working voltage.

Although the power supply is protected from over-current, for a manufacturer, the over-current protection point should be accurately and carefully designed. The power supply and the load will be easily damaged due to the over-current condition if the over-current protection point is too high. On the other hand, if the over-current protection point is too low, the over-current protection function will not effectively protect the power supply and the load.

When the power supply works in a steady state, the output current will not be higher than the over-current protection point. However, the output current may approximate or be higher than the over-current protection point only when the power supply is booting. A user has to choose an expensive high-performance power supply to prevent a high booting current from accidentally triggering the protection action.

In brief, a main purpose of the high-performance power supply is only to restrain the temporarily booting current. When the current is stable, the high-performance power supply acts as a general power supply. The high-performance power supply is usually much expensive than a general one. The cost for building a power system with the high-performance power supply is high.

SUMMARY OF THE INVENTION

An objective of the invention is to provide a power supply with output protection and a control method of the power supply. The power supply of the invention is adapted to compare a present output current with an over-current protection value and a pre-protection value lower than the over-current protection value. The output of the power supply is effectively protected. Furthermore, a user can use the power supply of the invention for decreasing cost, eliminating the need for using the high-performance one.

The control method of the invention comprises the steps of:
providing an over-current protection value;
setting at least one pre-protection value being lower than the over-current protection value;
acquiring a present output current of the power supply;
determining whether the present output current is higher than or equal to the pre-protection value;
taking an over-current protecting action when the present output current is higher than or equal to the over-current protection value;
executing a first temperature determination process when the present output current is between the pre-protection value and the over-current protection value;
stopping an output voltage of the power supply when a present temperature of the power supply is abnormal by executing the first temperature determination process; and
returning to the step of acquiring the present output current of the power supply when the present temperature of the power supply is normal by executing the first temperature determination process.

The method mentioned above mainly provides at least one pre-protection value lower than the over-current protection value. A detection action is taken under a condition that a present output current of the power supply is between the pre-protection value and the over-current protection value. Furthermore, the method can determine whether the power supply has any abnormal condition, i.e. overheat. When the abnormal condition occurs, the power supply of the invention stops providing a working voltage to a load. When the present output current is higher than or equal to the over-current protection value, the method takes the over-current protection action. The method provides a lead detection from the over-current protection value for dealing with unusual conditions and a temporarily rising current.

In short, a power supply executing the method of the invention is capable of enduring a high booting current by properly setting the over-current protection value. Expensive high-performance power supply is not needed.

The power supply of the invention comprises a rectifier circuit, a PFC circuit, a transformer, an output circuit, a power switch device, a PWM controller, a microcontroller, a current detector, a lead detection circuit and a temperature detector.

The rectifier circuit has an AC input terminal and a DC output terminal.

The PFC circuit has an input terminal and an output terminal. The input terminal is connected to the DC output terminal of the rectifier circuit.

The transformer has a primary side and a secondary side. The primary side is connected to the output terminal of the PFC circuit.

The output circuit has an input terminal and an output terminal. The input terminal is connected to the secondary side of the transformer. The output terminal generates an output current.

The power switch device is connected to the primary side of the transformer.

The PWM controller has at least one feedback input terminal and a PWM signal output terminal. The PWM signal output terminal is connected to the power switch device for activating or inactivating the power switch device.

The microcontroller provides an over-current protection value and has an output current detection terminal, an alarm signal output terminal, a temperature signal input terminal, a latch signal input terminal and an output terminal, wherein the output terminal is connected to the feedback input terminal of the PWM controller.

The current detector has an input terminal and an output terminal. The input terminal is connected to the output terminal of the output circuit. The output terminal is connected to the output current detection terminal of the microcontroller.

The lead detection circuit has a current signal input terminal and a latch signal output terminal. The current signal input terminal is connected to the output terminal of the current detector. The latch signal output terminal is connected to the latch signal input terminal of the microcontroller.

The lead detection circuit provides a pre-protection value and sends an alarm signal to the microcontroller when the output current of the output circuit reaches the over-current protection value, wherein the pre-protection value is lower than the over-current protection value.

The temperature detector is connected to the temperature signal input terminal of the microcontroller.

The power supply mentioned above provides the output protection mainly based on cooperation of the microcontroller and the lead detection circuit. The microcontroller provides an over-current protection value and at least one pre-protection value. The current detector detects a present output current from the power supply. When the present output current is higher than or equal to the pre-protection value and is lower than the over-current protection value, the microcontroller further detects a present temperature of the power supply through the temperature detector. When the present temperature is too high, the microcontroller sends a control signal to the PWM controller to take an over-temperature protection action. The PWM controller is then temporarily turned off and the output circuit stops providing the working voltage to the load.

When the present output current is higher than or equal to the pre-protection value and is lower than the over-current protection value, the lead detection circuit informs the microcontroller. The microcontroller then turns off the PWM controller and informs the load, such that a current received by the load from the power supply is reduced. A user can manually reboot the power supply.

For example, the over-current protection value can be 150% of a default output current. The pre-protection value can be 130% of the default output current. When the present output current is between 130% and 150% of the default output current, the microcontroller determines whether a present temperature is abnormal to take the over-temperature protection action. When the microcontroller determines the present temperature is not abnormal, it means that the present output current may be temporarily increased. For example, the output current is only greatly increased in a booting power supply. After the power supply has been booted, the output current returns to normal.

The output current of the booting power supply does not cause other abnormal phenomena, i.e. causing abnormal high temperature due to over-load. When the power supply works in a steady state, the method of the invention takes the over-current protection action until the output current abnormally rises due to over-load. By using the method of the invention, a manufacturer can properly set the over-current protection value to prevent a high booting current from accidently triggering the over-current protection action. The power supply of the invention still effectively practices the objective of output protection.

DETAILED DESCRIPTION OF THE PREFERRED EMBODIMENT

Figure 1:
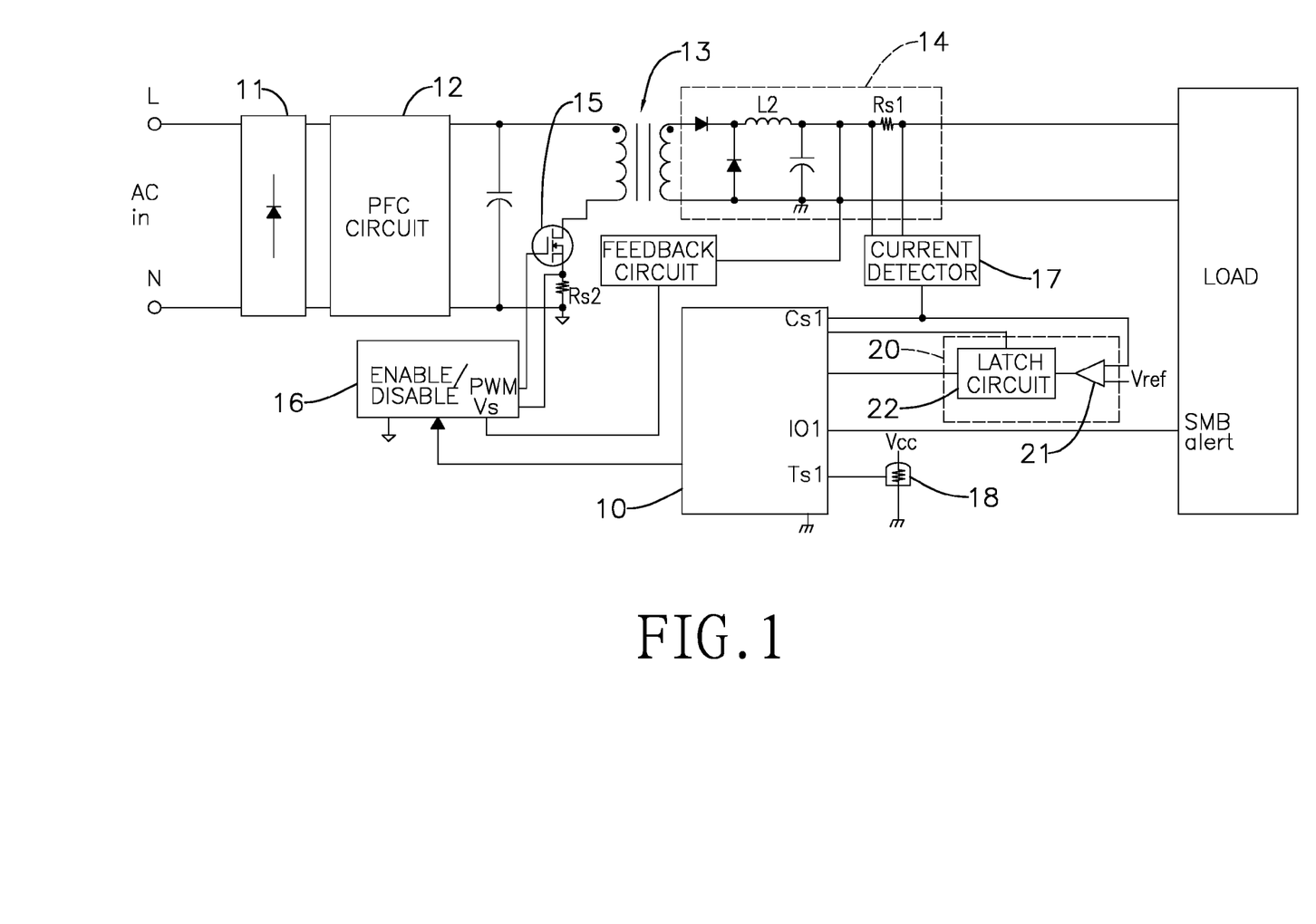
FIG. 1 is a circuit block diagram of a first embodiment of the power supply of the invention.

With reference to FIG. 1, the power supply of a first embodiment of the invention comprises a rectifier circuit 11, a PFC (Power Factor Correction) circuit 12, a transformer 13, an output circuit 14, a power switch device 15, a PWM (Pulse Width Modulation) controller 16, a microcontroller 10 and a current detector 17.

An input terminal of the PFC circuit 12 is connected to a DC output terminal of the rectifier circuit 11. The transformer 13 has a primary side and a secondary side. The primary side is connected to an output terminal of the PFC circuit 12. An input terminal of the output circuit 14 is connected to the secondary side of the transformer 13. The power switch device 15 can be a power transistor. The power switch device 15 is connected to the primary side of the transformer 13 and is turned on or turned off by the PWM controller 16.

The PWM controller 16 has a feedback input terminal (Vs), an enable/disable terminal (ENABLE/DISABLE) and a PWM signal output terminal (PWM). The PWM signal output terminal (PWM) is connected to the power switch device 15.

The microcontroller 10 has an output current detection terminal (Cs1), an alarm signal output terminal (IO1) and an output terminal. The output terminal of the microcontroller 10 is connected to the enable/disable terminal (ENABLE/DISABLE) of the PWM controller 16 for turning on or turning off the PWM controller 16. The alarm signal output terminal (IO1) of the microcontroller 10 is connected to a mainboard of a load. Before the PWM controller 16 is turned off, the microcontroller 10 can inform the mainboard that the PWM controller 16 is going to be turned off soon.

In this embodiment, the microcontroller 10 further has a temperature signal input terminal (Ts1) and a latch signal input terminal. The temperature signal input terminal (Ts1) is connected to a temperature detector 18. The latch signal input terminal is connected to the current detector 17. The current detector 17 mainly comprises a differential amplifier and an output resistor (Rs1) connected to an output terminal of the output circuit 14. Two input terminals of the differential amplifier are connected to two terminals of the output resistor (Rs1). The differential amplifier senses a present output current via the output resistor (Rs1). An output terminal of the differential amplifier is connected to the output current detection terminal (Cs1) of the microcontroller 10.

The power supply of the invention further comprises a lead detection circuit 20. In this embodiment, the lead detection circuit 20 comprises a comparator 21 and a latch circuit 22. A current signal input terminal of the comparator 21 is connected to an output terminal of the current detector 17. An input terminal of the latch circuit 22 is connected to an output terminal of the comparator 21. A latch signal output terminal of the latch circuit 22 is connected to the latch signal input terminal of the microcontroller 10.

The comparator 21 compares the present output current with a pre-alarm value. The pre-alarm value approximates, but is lower than, an over-current protection value. When the present output current of the power supply approximates the over-current protection value, the latch circuit 22 sends a latch signal to the microcontroller 10. The microcontroller 10 then sends an alarm signal to the mainboard and turns off the PWM controller 16 to stop providing a working voltage to the load.

The control method of the power supply of the invention comprises the steps as described below.

The microcontroller 10 has an over-current protection value and at least one pre-protection value or further has a protection threshold value. The protection threshold value is lower than the pre-protection value. The pre-protection value is lower than the over-current protection value. For example and convenience in description, the over-current protection value, the pre-protection value, the protection threshold value and the pre-alarm value can respectively be 150%, 130%, 110% and 148% of a default output current. The ratios are just illustrative examples and do not restrict this invention thereto.

With reference to FIGS. 2A-2D, a feasible flow chart of the method of the invention is disclosed. The microcontroller 10 detects a present output current from the output terminal of the output circuit 14 through the current detector 17 (step 201).

Figure 2A:
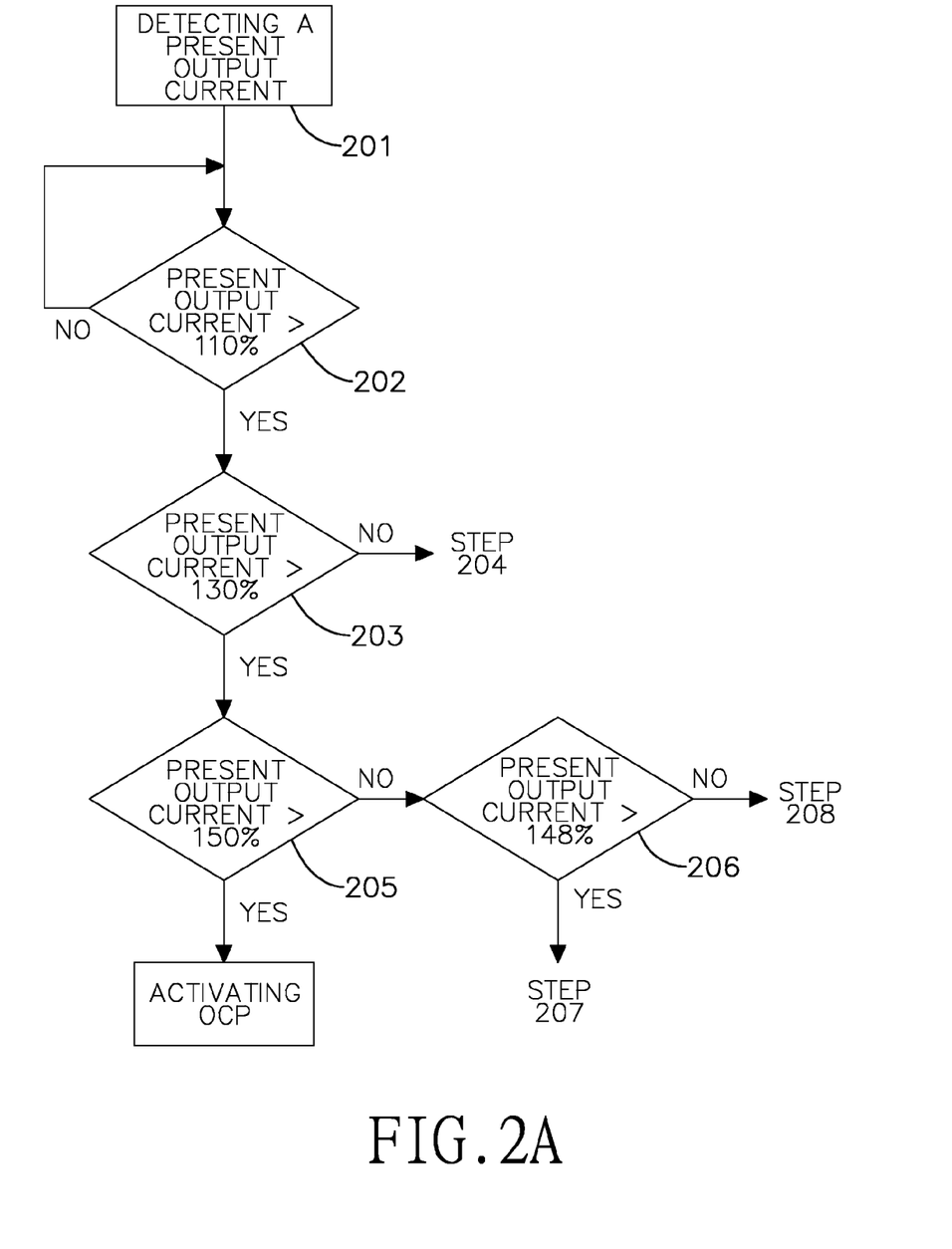
FIGS. 2A-2D are flow charts of the method of the invention.

When the microcontroller 10 acquires the present output current, the microcontroller 10 determines whether the present output current is higher than or equal to 110% of the default output current (step 202). When the present output current is not higher than or not equal to 110% of the default output current, i.e. the present output current is lower than the protection threshold value, the microcontroller 10 keeps determining whether the present output current is higher than or equal to 110% of the default output current until the present output current is higher than or equal to 110% of the default output current.

When the present output current is higher than or equal to 110% of the default output current, the microcontroller 10 determines whether the present output current is higher than or equal to 130% of the default output current (step 203).

When the present output current is between 110% and 130% of the default output current, the microcontroller 10 executes a temperature determination process (step 204) for determining if an over-temperature protecting (OTP) action should be activated. In this embodiment, with reference to FIG. 2B, the temperature determination process (step 204) comprises the steps (204A)-(204D).

Figure 2B:
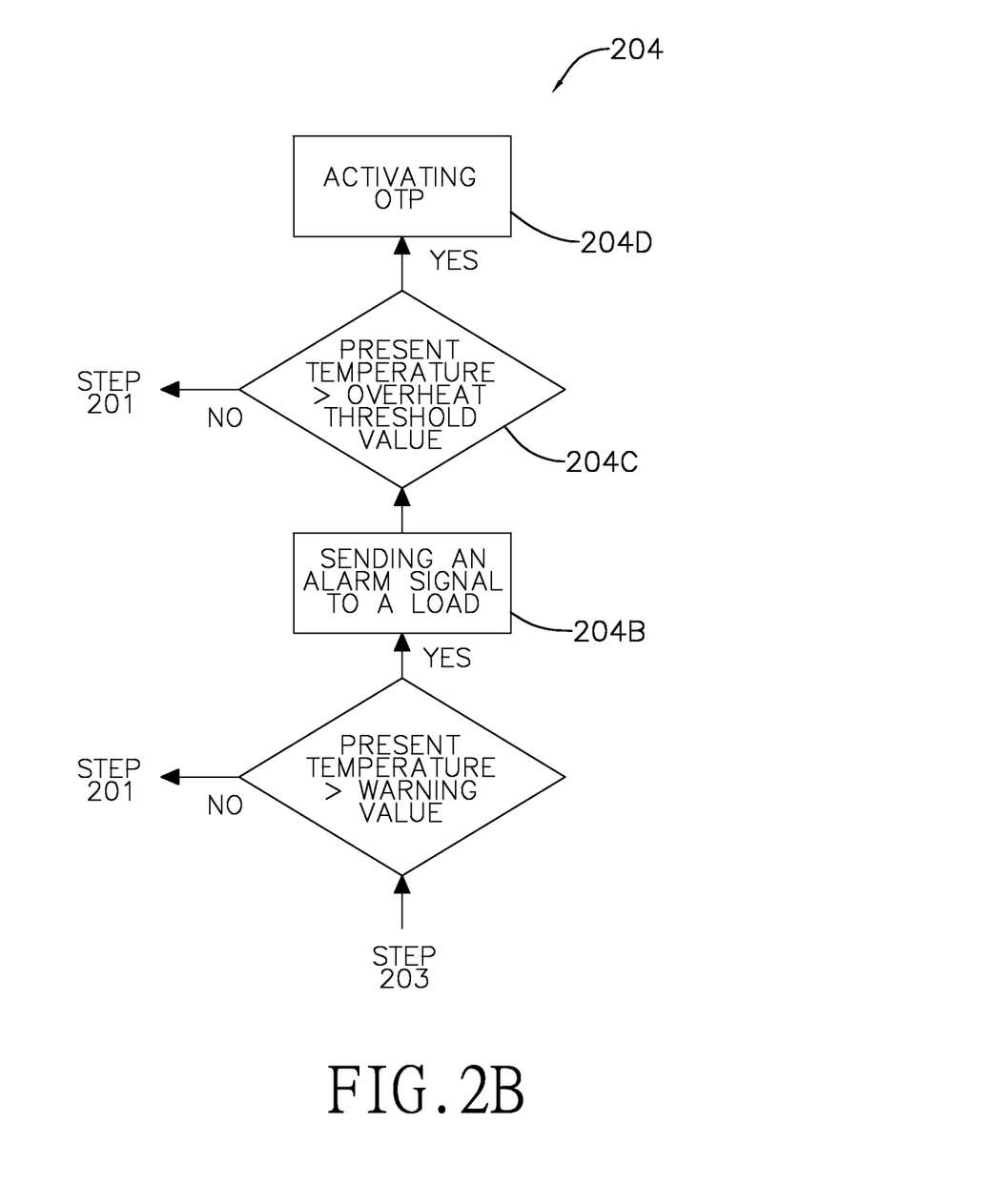

The microcontroller 10 determines whether a present temperature of the power supply is higher than or equal to a warning value (step 204A). When the present temperature is lower than the warning value, the microcontroller 10 returns to the step (201). When the present temperature is higher than or equal to the warning value, the microcontroller 10 sends an alarm signal to the load (step 204B). Meanwhile, the microcontroller 10 keeps turning on the PWM controller 16 and further determines whether the present temperature is higher than or equal to an overheat threshold value (step 204C). When the present temperature is lower than the overheat threshold value, the microcontroller 10 returns to the step (201). When the present temperature is higher than or equal to the overheat threshold value, the microcontroller 10 activates the over-temperature protecting (OTP) action (step 204D).

The over-temperature protecting (OTP) action is activated to temporarily turn off the PWM controller 16 by the microcontroller 10 to stop providing the working voltage to the load. If the present temperature of the power supply decreases, the microcontroller 10 will turn on the PWM controller 16 again. In other words, the over-temperature protecting (OTP) action is activated to automatically reboot the power supply when the present temperature returns to normal.

In the step (203), when the present output current is higher than or equal to 130% of the default output current, the microcontroller 10 further determines whether the present output current is higher than or equal to 150% of the default output current (step 205). When the present output current is higher than or equal to 150% of the default output current, the microcontroller 10 directly activates an over-current protecting (OCP) action. The over-current protecting (OCP) action is activated to turn off the PWM controller 16 by the microcontroller 10 to stop providing the working voltage to the load. Compared with the over-temperature protecting (OTP) action, the over-current protecting (OCP) action does not automatically reboot the power supply. A user has to manually turn on the power supply for ensuring safety.

Figure 2C:
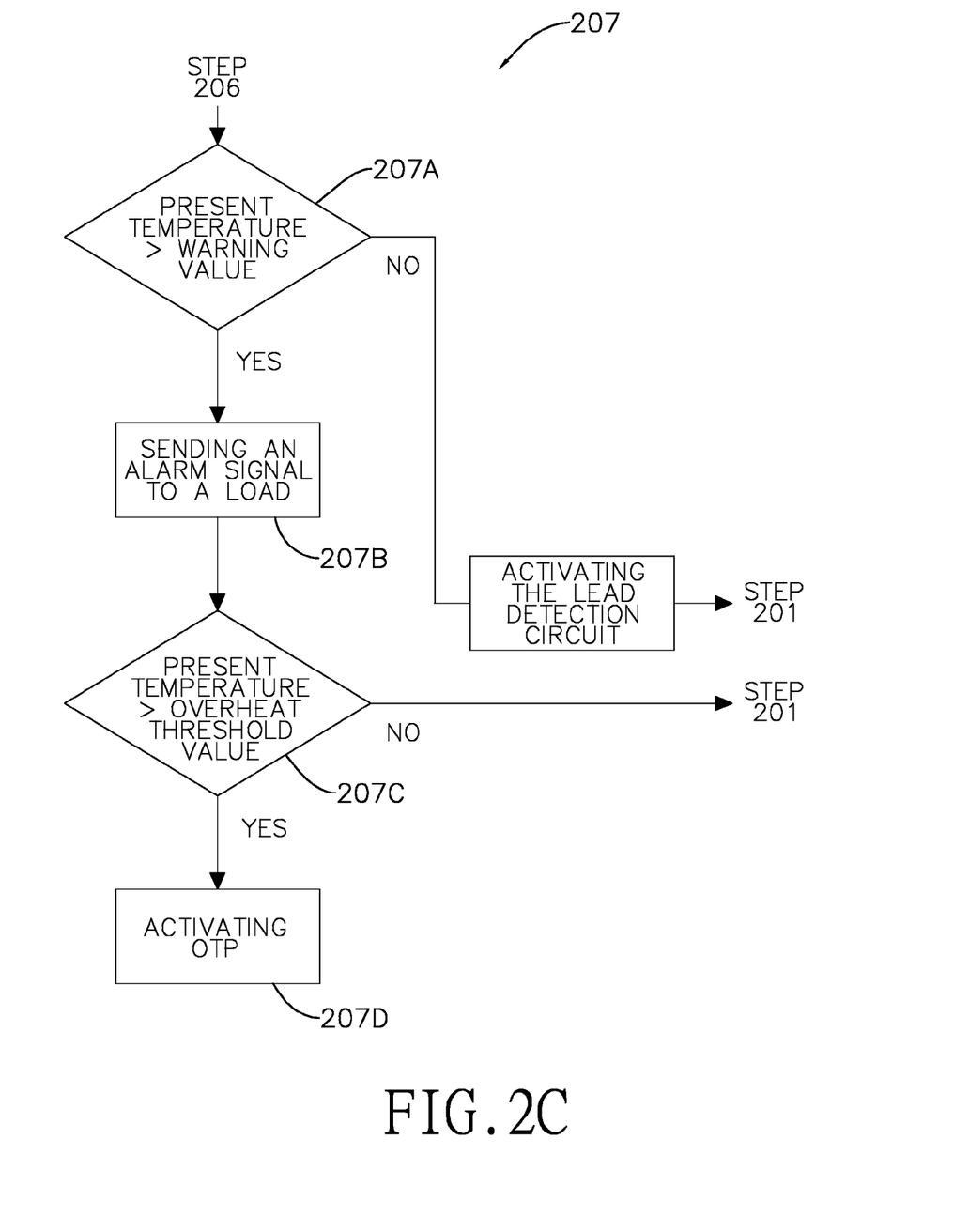

In the step (205), when the present output current is lower than 150% of the default output current, the microcontroller 10 determines whether the present output current is higher than or equal to the pre-alarm value (148% of the default output current) (step 206). When the present output current is higher than or equal to 148% of the default output current, the microcontroller 10 executes another temperature determination process (step 207). With reference to FIG. 2C, The temperature determination process (step 207) includes the steps (207A)-(207D).

The microcontroller 10 determines whether the present temperature is higher than or equal to a warning value (step 207A). When the present temperature is lower than the warning value, the microcontroller 10 resets the lead detection circuit 20 and returns to the step (201). When the present temperature is higher than or equal to the warning value, the microcontroller 10 sends an alarm signal to the load (step 207B). Meanwhile, the microcontroller 10 keeps turning on the PWM controller 16 and further determines whether the present temperature is higher than or equal to an overheat threshold value (step 207C). When the present temperature is lower than the overheat threshold value, the microcontroller 10 returns to the step (201). When the present temperature is higher than or equal to the overheat threshold value, the microcontroller 10 activates the over-temperature protecting (OTP) action (step 207D).

Figure 2D:
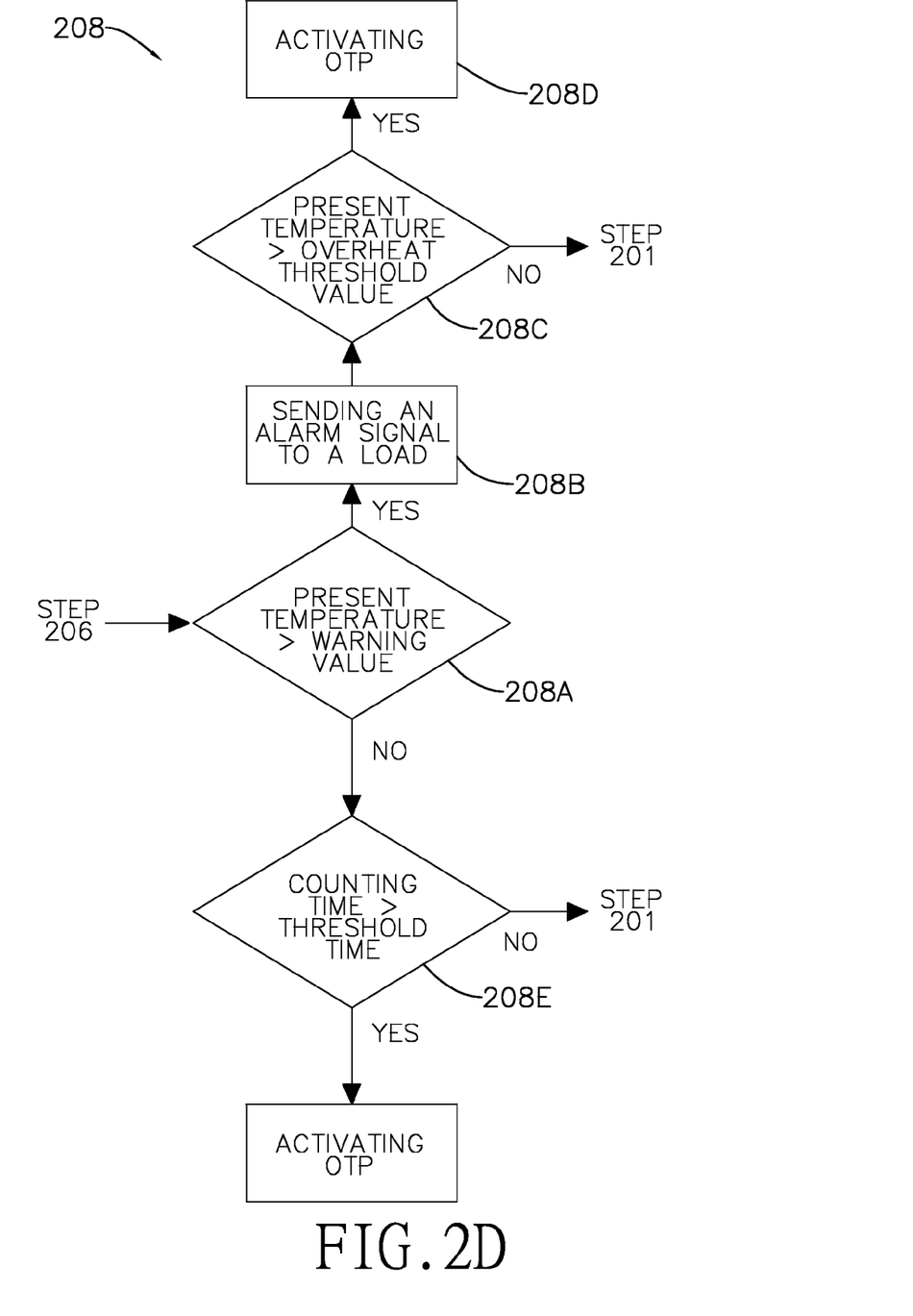

In the step (206), when the present output current is lower than 148% of the default output current, the microcontroller 10 executes further another temperature determination process (step 208). With reference to FIG. 2D, The temperature determination process (step 208) includes the steps as (208A)-(208E).

The microcontroller 10 determines whether the present temperature is higher than or equal to a warning value (step 208A). When the present temperature is lower than the warning value, the microcontroller 10 determines whether a counting time is longer than a threshold time, i.e. 15 (ms) (step 208E). The counting time stands for a time duration in which the present output current is higher than 130% of the default output current. When the counting time is shorter than the threshold time, the microcontroller 10 returns to the step (201). When the counting time is longer than or equal to the threshold time, the microcontroller 10 activates the over-current protecting (OCP) action.

In the step (208A), when the present temperature is higher than or equal to the warning value, the microcontroller 10 sends an alarm signal to the load (step 208B). Meanwhile, the microcontroller 10 keeps turning on the PWM controller 16 and further determines whether the present temperature is higher than or equal to an overheat threshold value (step 208C). When the present temperature is lower than the overheat threshold value, the microcontroller 10 returns to the step (201). When the present temperature is higher than or equal to the overheat threshold value, the microcontroller 10 activates the over-temperature protecting (OTP) action (step 208D).

In conclusion, the objective of the invention is to monitor the present output current through multi-level current values. Before the present output current is higher than or equal to the over-current protection value, the microcontroller 10 activates different protecting actions according to different ratios of the default output current. The method of the invention not only practices the over-current protection, but also effectively excludes a false action that the present output current temporarily increases, i.e. the power supply is booting. Hence, a manufacturer can raise an over-current protection point above a booting current. Users do not have to buy expensive high-performance power supply.

Figure 3:
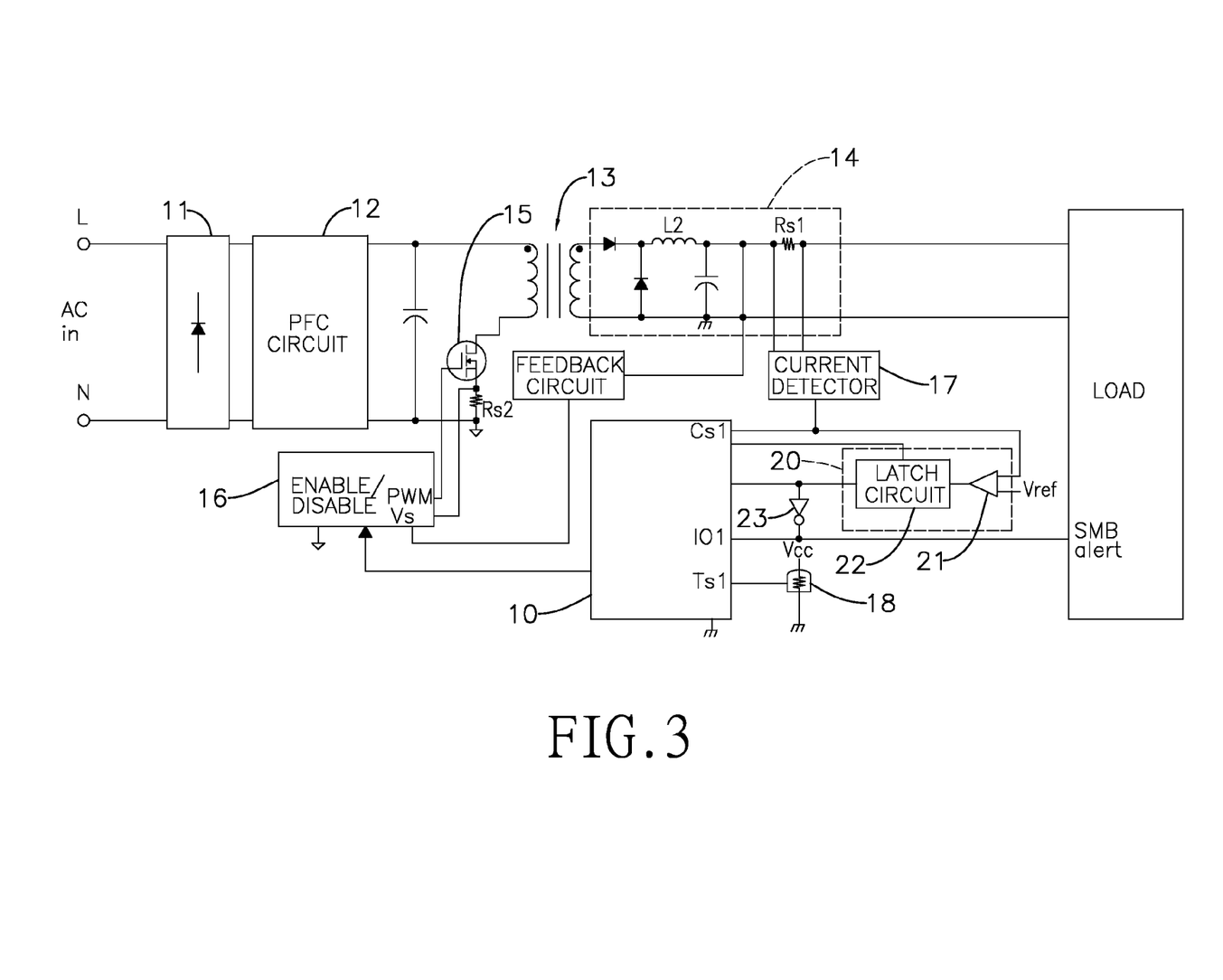
FIG. 3 is a second embodiment of the power supply of the invention.

With reference to FIG. 3, a second embodiment of the power supply of the invention is disclosed. The basic structure of the second embodiment is similar to the first embodiment. A difference between the second embodiment and the first embodiment is that the latch signal output terminal of the lead detection circuit 20 of the second embodiment is connected to both the latch signal input terminal of the microcontroller 10 and the alarm signal output terminal (IO1) of the microcontroller 10 through an inverter 23. The alarm signal output terminal (IO1) of the microcontroller 10 is connected to the mainboard of the load. When the present output current reaches the pre-alarm value, the lead detection circuit 20 directly informs the mainboard instead of via the microcontroller 10 to gain a response time for the mainboard.

What is claimed is:

1. A control method of a power supply, the control method comprising steps of:
   (a) providing an over-current protection value;
   (b) setting a pre-protection value being lower than the over-current protection value;
   (c) acquiring a present output current of the power supply;
   (d) determining whether the present output current is higher than or equal to the pre-protection value;
   (e) taking an over-current protecting action when the present output current is higher than or equal to the over-current protection value;
   (f) executing a first temperature determination process when the present output current is between the pre-protection value and the over-current protection value;
   (g) stopping an output voltage of the power supply when a present temperature of the power supply is abnormal by executing the first temperature determination process; and
   (h) returning to the step (c) when the present temperature of the power supply is normal by executing the first temperature determination process.

2. The method as claimed in claim 1, further comprising:
   determining whether the present output current of the power supply reaches a pre-alarm value when the present output current is lower than the over-current protection value;
   executing a second temperature determination process when the present output current of the power supply is higher than or equal to the pre-alarm value, wherein the second temperature determination process comprises:
   determining whether the present temperature of the power supply is higher than or equal to a warning value;
   returning to the step (c) and keeping providing a working voltage when the present temperature of the power supply is lower than the warning value;
   determining whether the present temperature of the power supply is higher than or equal to an overheat protection value;
   returning to the step (c) when the present temperature of the power supply is lower than the overheat protection value; and
   taking an over-temperature protecting action when the present temperature of the power supply is higher than or equal to the overheat protection value.

3. The method as claimed in claim 2, further comprising:
   executing a third temperature determination process when the present output current of the power supply is lower than the pre-alarm value, wherein the third temperature determination process comprises:
   determining whether the present temperature of the power supply is higher than or equal to the warning value;
   determining whether a counting time is longer than a threshold time when the present temperature of the power supply is lower than the warning value, wherein the counting time stands for a time duration in which the present output current of the power supply is higher than the pre-protection value;
   returning to the step (c) when the counting time is shorter than the threshold time; and
   taking an over-current protecting action when the counting time is longer than the threshold time.

4. The method as claimed in claim 3, wherein the third temperature determination process further comprises:
   sending out an alarm signal to a load, keeping providing the working voltage and further determining whether the present temperature of the power supply is higher than or equal to the overheat protection value when the present temperature of the power supply is higher than or equal to the warning value;
   returning to the step (c) when the present temperature of the power supply is lower than the overheat protection value; and taking the over-temperature protecting action when the present temperature of the power supply is higher than or equal to the overheat protection value.

5. The method as claimed in claim 1, further comprising:
determining whether the present output current of the power supply is higher than or equal to a protection threshold value before the step (d); and
keeping determining whether the present output current of the power supply is higher than or equal to the protection threshold value until the present output current is higher than or equal to the protection threshold value.

6. The method as claimed in claim 2, further comprising steps of:
determining whether the present output current of the power supply is higher than or equal to a protection threshold value before the step (d); and
keeping determining whether the present output current of the power supply is higher than or equal to the protection threshold value until the present output current is higher than or equal to the protection threshold value.

7. The method as claimed in claim 3, further comprising:
determining whether the present output current of the power supply is higher than or equal to a protection threshold value before the step (d); and
keeping determining whether the present output current of the power supply is higher than or equal to the protection threshold value until the present output current is higher than or equal to the protection threshold value.

8. The method as claimed in claim 4, further comprising:
determining whether the present output current of the power supply is higher than or equal to a protection threshold value before the step (d); and
keeping determining whether the present output current of the power supply is higher than or equal to the protection threshold value until the present output current is higher than or equal to the protection threshold value.

9. A power supply with output protection, the power supply comprising:
a rectifier circuit having an AC input terminal and a DC output terminal;
a PFC circuit having:
an input terminal connected to the DC output terminal of the rectifier circuit; and
an output terminal;
a transformer having:
a primary side connected to the output terminal of the PFC circuit; and
a secondary side;
an output circuit having:
an input terminal connected to the secondary side of the transformer; and
an output terminal generating an output current;
a power switch device connected to the primary side of the transformer;
a PWM controller having:
an enable/disable terminal;
at least one feedback input terminal; and
a PWM signal output terminal connected to the power switch device for activating or inactivating the power switch device;
a microcontroller providing an over-current protection value and having an output current detection terminal, an alarm signal output terminal, a temperature signal input terminal, a latch signal input terminal, and an output terminal, wherein the output terminal of the microcontroller is connected to the enable/disable terminal of the PWM controller;
a current detector having:
an input terminal connected to the output terminal of the output circuit; and
an output terminal connected to the output current detection terminal of the microcontroller;
a lead detection circuit having:
a current signal input terminal connected to the output terminal of the current detector; and
a latch signal output terminal connected to the latch signal input terminal of the microcontroller;
the lead detection circuit providing a pre-protection value and sending an alarm signal to the microcontroller when the output current of the output circuit reaches the over-current protection value, wherein the pre-protection value is lower than the over-current protection value; and
a temperature detector connected to the temperature signal input terminal of the microcontroller.

10. The power supply as claimed in claim 9, the lead detection circuit further having:
a comparator having:
a current signal input terminal connected to the output terminal of the current detector; and
an output terminal; and
a latch circuit having:
an input terminal connected to the output terminal of the comparator; and
a latch signal output terminal connected to the latch signal input terminal of the microcontroller.

11. The power supply as claimed in claim 9, wherein the latch signal output terminal of the lead detection circuit is connected to the alarm signal output terminal of the microcontroller.

12. The power supply as claimed in claim 10, wherein the latch signal output terminal of the lead detection circuit is connected to the alarm signal output terminal of the microcontroller.

13. The power supply as claimed in claim 11, wherein the latch signal output terminal of the lead detection circuit is connected to the alarm signal output terminal of the microcontroller through an inverter.

14. The power supply as claimed in claim 12, wherein the latch signal output terminal of the lead detection circuit is connected to the alarm signal output terminal of the microcontroller through an inverter.

* * * * *